May 8, 1945.  L. I. YEOMANS  2,375,269
BEARING
Filed July 24, 1940  2 Sheets-Sheet 1
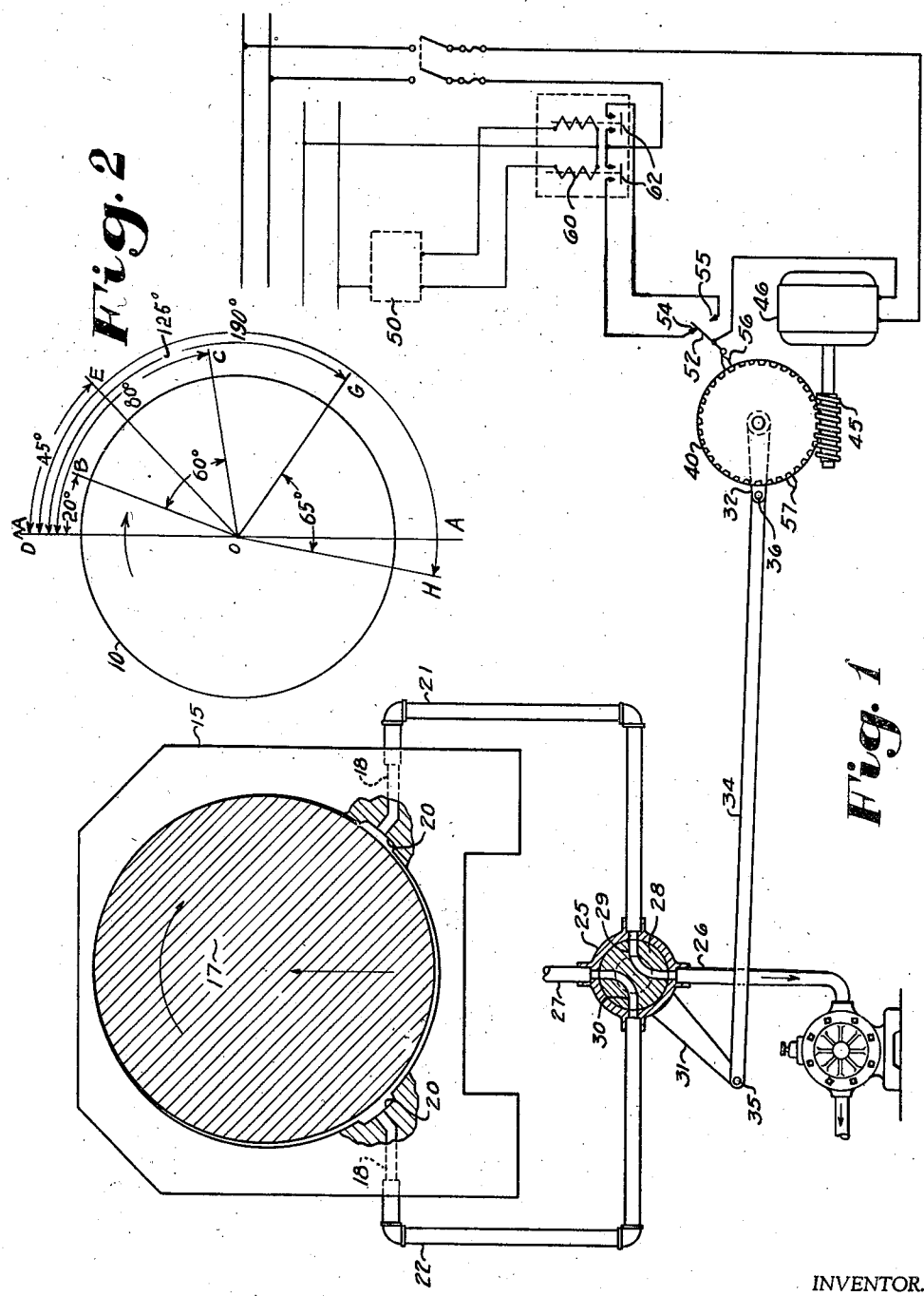
INVENTOR.
LUCIEN I. YEOMANS
BY
ATTORNEYS.

May 8, 1945.　　　　　L. I. YEOMANS　　　　　2,375,269
BEARING
Filed July 24, 1940　　　2 Sheets-Sheet 2

INVENTOR.
LUCIEN I. YEOMANS
BY
ATTORNEYS.

Patented May 8, 1945

2,375,269

UNITED STATES PATENT OFFICE 2,375,269

BEARING

Lucien I. Yeomans, Chicago, Ill., assignor to E. W. Bliss Company, Brooklyn, N. Y., a corporation of Delaware Application July 24, 1940, Serial No. 347,224

7 Claims. (Cl. 308—122)

This invention relates to bearings and means for lubricating the same and is particularly directed to the provision of a constant oil film in bearings operated under such loads and speeds that there is a marked tendency for the oil film to break down under ordinary operating conditions.

In bearing lubrication it is essential that there be no metal to metal contact between the parts and that a narrow wedge of lubricant, usually oil, be continually supplied at the point of maximum pressure between the parts to insure that the one bearing member will ride in the other on a constantly changing layer of lubricant. In an ordinary sliding journal bearing in which the line of application of load force is assumed as vertical the point at which the surfaces are nearest to each other will be approximately 20 to 80° ahead of the line of load force, in the direction of journal rotation, depending upon the speed and load.

Due to the tolerances between the journal and the bearings there will be a point of maximum clearance between the parts 180° opposite the point of least separation, resulting in the provision of an annular tapered wedge space on each side of the point of least separation.

Under ideal lubricating conditions lubricant is fed into the wedge at a wide part thereof behind the point of least separation to provide a film cushion between the parts at the said point. If the film breaks down for any appreciable time there is bearing failure.

The general object of my invention has been to provide means for lubricating a bearing such that film breakdown will not occur and the requisite amount of lubricant will be continually supplied to the bearing. A further object of the invention has been to provide means for removing excess lubricant after the oil has passed the point of least separation. Still another object of the invention has been to adapt my lubricating means to bearings which are reversed in direction of rotation and to those which continually rotate in one direction.

To the accomplishment of the foregoing and related ends, said invention, then, consists of the means hereinafter fully described and particularly pointed out in the claims; the annexed drawings and the following description setting forth in detail certain structure embodying the invention, such disclosed structure constituting, however, but one of various forms in which the principle of the invention may be used.

In said annexed drawings—

Fig. 1 is a diagrammatic showing of a bearing and lubricating means therefor in accordance with my invention;

Fig. 2 is a graphical representation showing the operating characteristics of a journal rotating in a member;

Referring first to Fig. 2, there is illustrated an annular bearing surface between journal and bearing indicated by the circle 10. It is assumed that the bearing is so mounted that the line of load force will be along line A—A and that the journal is urged upwardly against the bearing in the direction indicated by the line A—A. The direction of journal rotation is clockwise.

A bearing mounted as indicated above will, depending upon the speed and load, have a point of least separation of the bearing surfaces, which is the point most critical in lubrication. It will lie between 20° and 80° ahead of the line of force, in the direction of journal rotation, as indicated by the sector bounded by the lines O—B and O—C. Similarly, the point of maximum oil film pressure as determined by the wedge shaped opening between the journal and bearing will vary from the point coinciding with the line of force to a point 45° ahead of the same, as indicated by the lines O—D and O—E.

The point of minimum oil film pressure under the above conditions varies from approximately 125 to 190° in the direction of rotation as indicated by the line O—G and O—H respectively. It will be apparent that if the line O—B represents the point of least separation between the bearing surfaces the point of maximum separation will be opposite to or 180° therefrom.

The bearing characteristics set out above are as indicated, and the variations are due to the speed and load imposed upon the parts. These variations in a given bearing require the use of average conditions as a ground for design.

I have worked out a satisfactory compromise in the factors of bearing lubrication, depending upon whether the bearing is to be mounted for rotation in one direction or is to be subject to a reversal of rotation.

Figure 3:
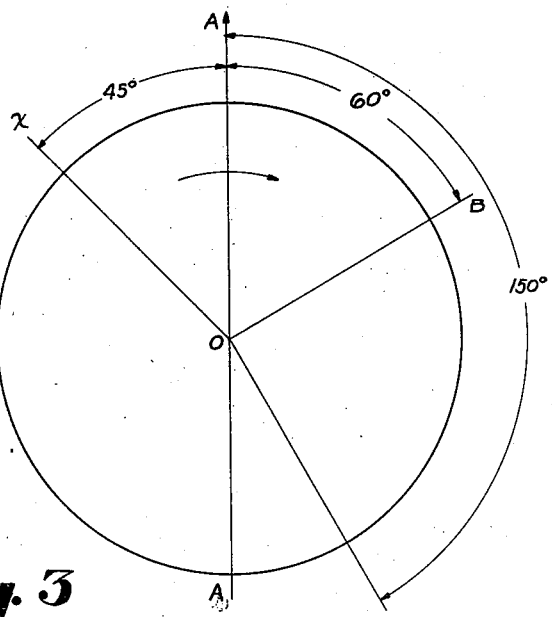
Fig. 3 is a graphical representation of my invention embodying a bearing rotating continually in the same direction.

A bearing adapted to be continuously rotated in one direction is diagrammatically illustrated in Fig. 3. Here the line O—B of least separation will always lie on the same side of and in advance of the line of force A—A. Under these conditions it has been found that if lubricant is admitted to the wedge space behind the line of least separation and at approximately the line O—X 45 degrees behind the line A—A, as indicated in Fig. 3, the maximum average lubrication efficiency will be attained under all conditions. Similarly, it has been found that if the oil, having passed beyond the point O—B and entering into the wedge established ahead of that point is removed from between the surfaces approximately 150 degrees ahead of the line A—A, as indicated, the best compromise for a removal point for lubricant will have been attained.

Figure 4:
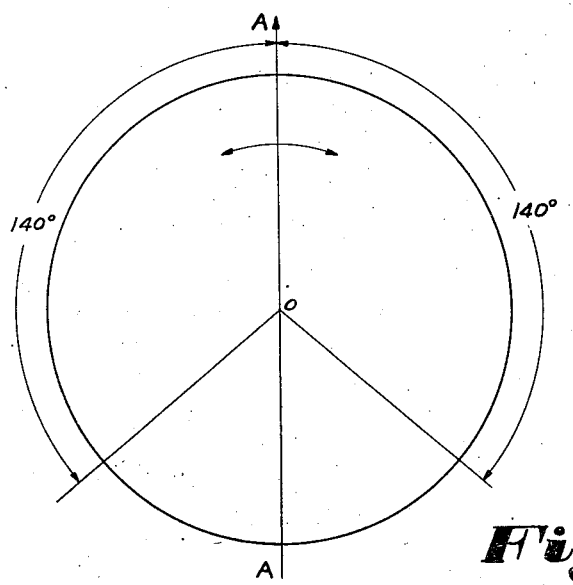
Fig. 4 is a view similar to Fig. 3 showing the lubrication of a bearing adapted for reversal in rotation.

A bearing which is to be operated under average conditions and reversed in direction of rotation will, as a compromise, be lubricated as shown in Fig. 4. In this figure two points for admission or removal of lubricant to the bearing are shown alternately used for one or the other purpose, depending upon the direction of rotation. These two points are each 140 degrees on either side of the line A—A, representing the line of bearing force. When the journal is rotated in a clockwise direction oil is admitted at the left-hand point and carries up and around the decreasing wedge to and beyond the point of least bearing separation. Thereafter it continues to the right-hand oil port where it is largely removed from the bearing. The points of admittance and removal of oil are reversed when the bearing direction of rotation is reversed.

A reversing bearing must, as stated above, be so arranged that oil can alternately be supplied to the bearing at one side of the line of force arrow and removed from the other, depending upon the direction of rotation. Mechanism by which this can be attained is shown in Fig. 1. Referring now to that figure, I have shown a bearing 15, in this case the chuck for an upper backing roll in a four-high rolling mill. Rotatably mounted within a central bore of the chuck is the journal 17. Under the above conditions the line of bearing force, or push on the journal, will be vertically upward toward the top of the figure as indicated by the arrow. In adapting the diagrammatic showing of Fig. 4 to the actual bearing one or more passages 18 communicate with recesses 20 extending parallel with the axis of the journal, exaggerated in size as shown in the drawings, of the housing 15. In many cases the recesses as such would not be present and the lubricant would be fed directly to the space defined by the clearance between the parts. Two of the said recesses are provided, each lying approximately 140 degrees on either side of the line O—A. The connections 18 on each side of the bearing axis connect with piping 21 and 22 respectively, which pipes in turn communicate with a four-way valve 25 as shown. The remaining opposite ports in the valve communicate with a low pressure oil supply 27 and a lead 26 to a vacuum pump respectively. A valve member 28 is rotatably mounted within the casing and provided with a pair of passages 29 and 30 as shown. By means of these passages it is possible to alternately connect one of the pipes 21 or 22 to apply oil under pressure to the bearing and the other pipe to the vacuum pump to remove oil from the bearing.

To operate the four-way valve an arm 31 (integral with valve 28) is provided which is connected to a crank arm 32 by a link 34 pivoted to the parts as at 35 and 36. A control disk 40 is mounted to rotate with the crank 32 on its axis 42. To drive the mechanism the disk is in the form of a worm gear which is engaged by a worm 45 positively driven by a reversible electric motor 46 from a suitable power source.

The bearing lubricating system is controlled from the same panel which is used to operate the mill drive motor. This includes a push button station indicated at 50 in Fig. 1, which is provided with forward, stop and reverse buttons. Controlled from the panel is a double throw contactor switch 52 provided with a pair of contact members 54 and 55 by which alternate circuits may be set up through a common line leading to the motor 46. The system is so arranged that the contact 54 drives the motor to position the parts for rotation of the journal in the direction of the arrow, Fig. 1, and the contact member 55 controls the operation of the motor in a reversed direction.

The control disk 40 is provided with a pair of arms 56 and 57 which engage the end of a rocking arm of the switch 52 to rock the same for alternate engagement with the members 54 or 55.

Assuming that the direction of rotation of the mill is such that the journal 17 rotates in the direction of the arrow (Fig. 1) the timer and the switch contacts will be positioned as indicated in Fig. 1. If the stop button of the panel 50 is pushed to stop the mill there will be no actuation of the control motor and its associated mechanism. However, if the reverse button is pressed the control motor is immediately started in a reverse direction from the preceding motion and the disk 40 rotates until the contact 57, spaced 180° from the preceding active contact 56, moves around to rock the switch arm from the position of Fig. 1 to a position in contact with the other contact member 55. At this time the connection to the motor will be broken and the parts controlled through the link 34 will have been shifted to a position opposite to that of Fig. 1, establishing the mill for rotation in a reversed direction.

The circuits established and broken through the contacts 54 and 55 are in the first instance initially set up by pushing the proper button on the panel 50. Thus, depending on the direction of rotation of the mill desired, a button will be pushed to actuate one of the solenoids 60, closing a corresponding contactor 62 to establish a circuit to the motor 46. It follows that only that solenoid electrically connected through the switch 52 and one of its contacts at the time the button is pressed can be energized to close the corresponding contactor switch 62.

Thus if a button is pushed which does not effect a reversal of the mill the solenoid indicated will not be actuated because the corresponding contact 54 or 55 will not complete a circuit to the motor. On the other hand, due to the arrangement of parts, when a button is pushed effecting a reversal of the motor the parts will have been positioned such that a complete circuit is established to the motor, accomplishing the desired result.

Upon reversal of direction of rotation the piping 22, through which oil has been supplied to the bearing, is now employed to withdraw lubricant therefrom, and the piping 21 supplies lubricant to the bearing instead of serving as a means for its removal. Thus, at the time of reversal of journal rotation the lubricating system is automatically reestablished to comply with the new operating conditions. At the end of a half revolution of the disk 40 the contact members on the disk open the switch 52 which breaks the control motor circuit and stops the motor and the control disk. This leaves the four-way valve set as above indicated to supply and withdraw oil from the bearing during rotation in a direction opposite to that of the arrow in Fig. 4. When the button involving roll reversal is pressed the process is reversed because the direction of motor rotation is reversed until after a half revolution when it is opened by the contact member 54.

From the foregoing description it will be seen that I have provided a new and improved manner for lubricating bearings when the same are mounted either for rotation in the same direction at all times or for reversal.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a bearing with a journal and a housing adapted to be rotated relative to each other in sliding friction contact, means to apply lubricant under pressure to said bearing at a point behind the line of least separation of the parts in the direction of rotation, and means to withdraw lubricant from said bearings under vacuum at a point ahead of the said line of least separation in the direction of rotation.

2. A bearing comprising a housing and a journal rotatably carried therein and adapted for reversal in direction of rotation such that a load carried by said journal is transmitted to said housing along a line of load application with the point of least separation between journal and housing lying alternately on one or the other sides of said line depending on the direction of rotation and means to apply lubricant to said bearing behind the line of least separation and remove lubricant from said bearing ahead of the line of least separation irrespective of the direction of bearing rotation.

3. In a bearing with a journal and a housing adapted to be rotated relative to each other in sliding friction contact, with a load acting vertically upward, means to apply lubricant under pressure to said bearing at a point approximately 45 degrees behind the line of force.

4. In a bearing with a journal and a housing adapted to be rotated relative to each other in sliding friction contact, with a load acting vertically upward, means to withdraw lubricant from said bearing under vacuum at a point approximately 150 degrees ahead of the line of force.

5. In a bearing with a journal and a housing adapted to be rotated relative to each other in sliding friction contact, with a load acting vertically upward, means to apply lubricant under pressure to said bearing at a point approximately 45 degrees behind the line of force, and means to withdraw lubricant from said bearing under vacuum at a point approximately 150 degrees ahead of the line of force.

6. In a bearing comprising a housing and a journal rotatably carried therein and adapted for reversal in direction of rotation such that a load carried by said journal and acting in vertically upward direction is transmitted to said housing along a line of load application with the point of least separation between journal and housing lying alternately on one or the other sides of said line depending on the direction of rotation, means to apply lubricant through the housing wall at a point approximately 140 degrees from and behind the line of load irrespective of the direction of bearing rotation.

7. In a bearing comprising a housing and a journal rotatably carried therein and adapted for reversal in direction of rotation such that a load carried by said journal and acting in vertically upward direction is transmitted to said housing along a line of load application with the point of least separation between journal and housing lying alternately on one or the other sides of said line depending on the direction of rotation, means to apply lubricant through the housing wall at a point approximately 140 degrees from and behind the line of load, and means to withdraw lubricant from said bearing at a point approximately 140 degrees from and ahead of the line of load irrespective of the direction of bearing rotation.

LUCIEN I. YEOMANS.